April 18, 1967     E. W. FRIES ETAL     3,314,381

APPARATUS FOR FILLING BAKED PRODUCTS

Filed Nov. 27, 1962     2 Sheets-Sheet 1

United States Patent Office 3,314,381
Patented Apr. 18, 1967

3,314,381
APPARATUS FOR FILLING BAKED PRODUCTS
Edward W. Fries, Baltimore, Md., and Harold B. Kaufman, Jr., New York, N.Y., assignors to DCA Food Industries, Inc., New York, N.Y., a corporation of New York
Filed Nov. 27, 1962, Ser. No. 240,232
18 Claims. (Cl. 107—1)

The present invention relates generally to improvements in equipment for the production of comestibles. It relates in particular to an improved apparatus for the shaping and filling of dough pieces in the production of baked products of various configurations and compositions such as cinnamon rolls and the like.

In U.S. Patent No. 2,982,231, granted May 2, 1961, to Edward W. Fries there is disclosed an apparatus for producing shaped pieces of dough in which there is provided a tubular extrusion nozzle connected to a source of dough under pressure and a flat spiral, fluid injector tube is located in the nozzle transversely thereof and is connected to a source of liquid under pressure, the injector tube having openings formed therein permitting the passage of the liquid from the tube into the surrounding dough. While the apparatus described in the above identified patent operates in a highly successful manner it possesses certain drawbacks and disadvantages. By reason of the high area of intercept of the dough extrusion nozzle by the injector tube, the length of the ejector tube and the number of convolutions thereof are limited. A further consequence is the undesirable high back pressure produced in the nozzle by reason of the large area of intercept and the difficulty in employing dough containing raisins or the like since such large ingredients would be held up by the small spacing of the spiral convolutions. Another drawback of the apparatus heretofore proposed or employed is the tendency of the fluid ejection openings to be clogged by the dough and the nonuniformity of distribution of the filling material.

It is, therefore, a principal object of the present invention to provide an improved apparatus for the production of comestibles.

Another object of the present invention is to provide an improved apparatus for the shaping of pieces of dough for the production of baked products of various configurations.

Still another object of the present invention is to provide an improved apparatus for injecting a filling material into dough attendant the extrusion and cutting thereof.

A further object of the present invention is to provide an improved apparatus for the production of spiral pieces of dough typified by cinnamon buns having a plurality of convolutions.

A still further object of the present invention is to provide an improved apparatus of the above nature characterized by its reliability, flexibility, simplicity and ruggedness.

The above and other objects of the present invention will become apparent from a reading of the following description, taken in conjunction with the accompanying drawing wherein.

Figure 1:
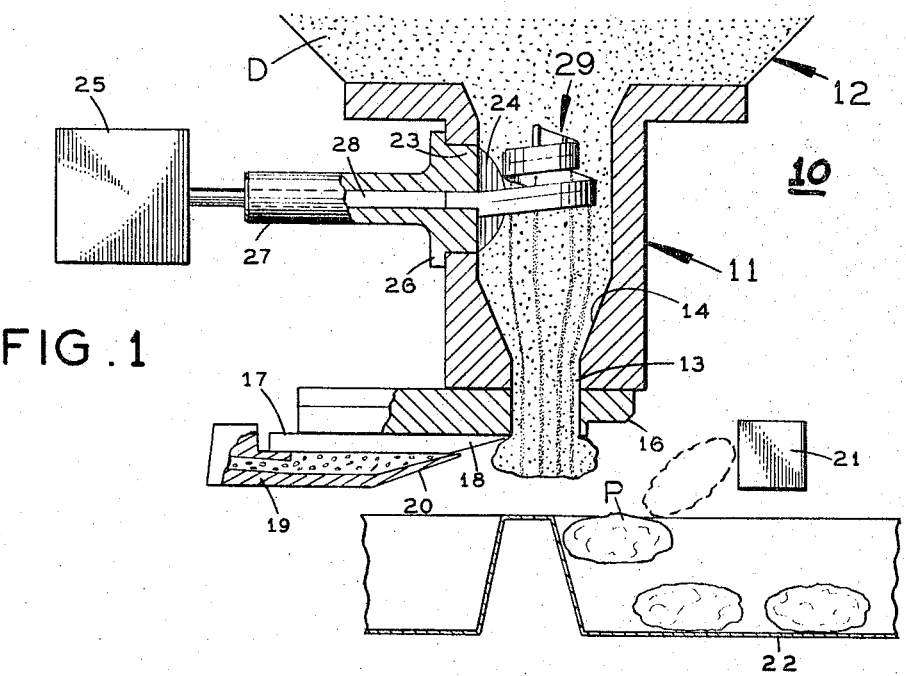
FIGURE 1 is a vertical medial fragmentary sectional view of a dough piece forming apparatus constructed according to and embodying the present invention.

In a sense the present invention contemplates the provision of a device for producing shaped pieces of dough comprising a nozzle having a discharge opening, means for extruding dough along said nozzle and through said discharge opening, and a tubular fluid injecting member substantially in the shape of a helix of decreasing diameter located in said nozzle and being provided along the length thereof with means to discharge fluid into the dough.

Another feature of the present invention resides in the structure of the fluid injecting member which has a longitudinally extending channel formed in the face thereof directed toward the nozzle discharge opening, the channel communicating with the interior of the fluid injecting members as by way of a plurality of longitudinally spaced bores.

In accordance with a preferred form of the present apparatus, the dough extrusion nozzle is connected to a hopper containing dough under the pressure of compressed air and the hopper converges toward the discharge opening, a dough cutting blade being periodically reciprocated across the discharge opening. The fluid injection member is supported by a wall of the nozzle and may be of decreasing diameter in an upward or downward direction, being provided with a relatively sharp upwardly directed face to facilitate the passage of the dough. The lower edge of the helical fluid injection member is above the upper edge of the next lower convolution thereof whereby to provide a wide unobstructed opening for the passage of the dough. A distributing channel is formed along most of the length of the underface of the fluid ejection member substantially to the free end thereof which communicates with the interior of the fluid injection member as by way of a plurality of longitudinally spaced bores formed therein and countersunk at their inner ends.

Referring now to the drawings and more particularly to FIGURES 1 to 4 thereof, which illustrate a preferred embodiment of the present invention as applied to the production of cinnamon buns, reference numeral 10 generally designates the improved apparatus which includes a downwardly directed dough extrusion nozzle 11 communicating at its upper end with a hopper 12 of conventional construction, in which the dough D is exposed to compressed air to effect its extrusion through nozzle 11, it being understood that other mechanisms may be employed for causing movement of the dough toward and through the nozzle 11. Nozzle 11 terminates at its bottom in a discharge opening 13, the inside face 14 of nozzle 11, above the opening 13, converging thereto to define a funnel to the discharge opening.

Disposed under and abutting the underface of nozzle 11 is a knife guide 16 having an opening therein registering with and of the same outline as discharge opening 13. Slideably engaging the underface of knife guide 16 is a gate and knife member 17 having a sharp leading edge 18, and means are provided for periodically reciprocating knife 17 to alternately open and close the opening in guide 16. Mounted on the underface of knife 17 and reciprocatable therewith is an air nozzle 19 having a jet 20 directed upwardly and forwardly along the bottom of knife edge 18. Nozzle 19 is connected to a source of compressed air by way of a valve which is periodically opened with the knife cutting stroke. A detailed description of the above cutting mechanism is given in the copending patent application of Edward W. Fries, Ser. No. 138,074, filed Sept. 14, 1961. Forward of and below knife guide 16 is a transversely extending dough piece deflecting bar 21, while pans 22 are successively transported below the extrusion device in synchronism with reciprocating knife 17.

The fluid injection assembly comprises a coupling member including a plug 23 tightly registering with a mating opening formed in the wall of the nozzle 11 above the funnel section 14 and is provided with an inner concave face 24 to form a smooth cylindrical nozzle bore with the surrounding inner face of the nozzle 11. A peripheral flange 26 is formed on plug 23 and abuts the outer face of nozzle 11. Projecting outwardly from plug 23 is a suitable coupling shank 27, having an axial bore 28 extending therethrough and through plug 23. Bore 28 is connected by appropriate tubing to a source 25 of liquid or fluid material under pressure as, for example, in the manner described in the aforesaid Fries patent.

Figure 2:
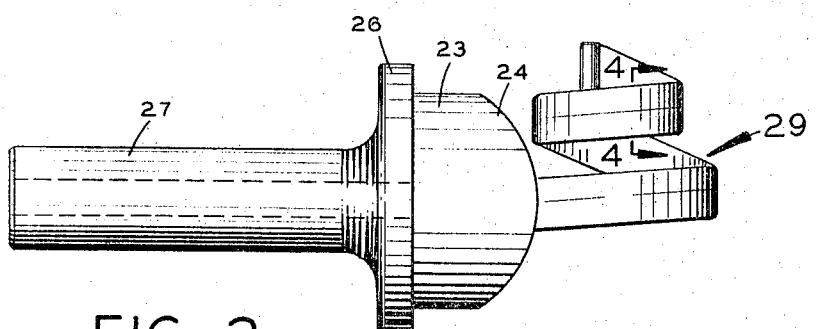
FIGURE 2 is a front elevational view of the fluid injection element employed therewith.
Figure 3:
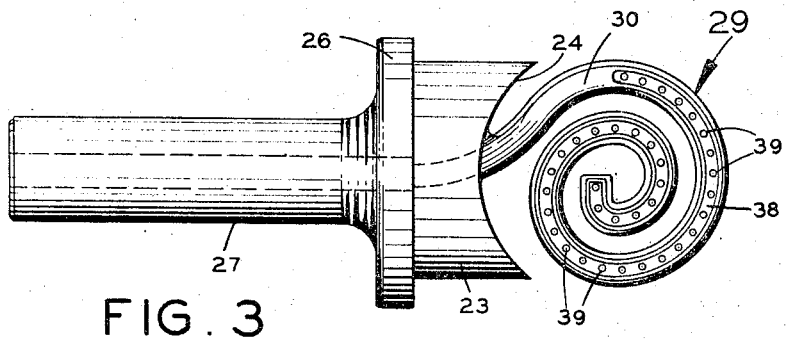
FIGURE 3 is a bottom view thereof.

Mounted on face 24 of plug 23 in any suitable fashion, as by welding, is a tubular fluid injection member 29 which embodies the present invention. Injection member 29 is of spiral helical configuration and is coaxial with nozzle 11. Trailing section 30 of injection member 29 extends to and communicates with coupling bore 28 in shank 27, and progresses upwardly preferably at a substantially uniform angular pitch and inwardly at preferably a substantially uniformly decreasing radius of curvature. The free inner end of the injection member is preferably closed. Advantageously, injection member 29 has at least one and a half and preferably two convolutions, and the reduction of the radius of curvature of injection member 29 per convolution is greater than the width of the injection member tube so that a vertically aligned passage way of spiral configuration is provided, as seen in FIGURE 3 of the drawings. Furthermore, the pitch of the helix or its axial advance per revolution is greater than the height of the injection tube to provide a radial horizontal passageway between successive convolutions as seen in FIGURES 1 and 2 of the drawings. Thus, a relatively large opening is provided for the advance of the dough through the nozzle 11 through and past the full cross section thereof, whereby to permit the passage of coarse ingredients which may be carried by the dough such as raisins or the like, and to provide a minimum of impedance and back pressure to the uniform extrusion of the dough. It is important to note that even with an increase in the number of convolutions and an increase in the width of the injection member tube, and the consequent reduction of aligned vertical passageway area, the available open area for the passage of the dough may be increased to any suitable or desirable value by increasing the pitch of the injection member spiral helix thereby to increase the area of the horizontal passage therethrough.

Injection member 29 is advantageously of streamlined transverse cross section to offer minimum resistance to the flow of the dough, being of elongated configuration and having an upstream or upwardly directed face 32 tapered to a relatively sharp edge as at 33. The trailing side faces 34 of the injection tube taper gently inwardly downwardly to a downstream face 36 directed toward the discharge opening 13. The bore 37 of the injection tube is of oval cross section, with a vertical major axis.

Formed in the downstream face 36 of injection member 29 and extending from the inner end to a point approximately one quarter convolution from its outer end is a channel 38 having a downstream directed opening and delineating a fluid distributing zone. A plurality of longitudinally spaced bores 39 are formed in the bottom wall of the injection tube and afford fluid communication between the bore 37 thereof and channel 38. The inner ends of bores 39 are countersunk as as 40 to provide funneled openings into bores 39. This facilitates the outward flow of material and inhibits the locking of dough in bores 39 which would accompany the reduction of pressure in the bore 37 beblow that of the surrounding dough, for example, as a result of a drop in pressure in the source 25. The funneled entrances 40 to the bores 39 facilitate the ejection of dough which may enter and sometimes plug bores 39, upon the application of pressure to fluid in bore 37. It should be noted that the width of the channel 38 is advantageously between 1/64 and 1/8 inch, preferably about 1/16 inch, the diameter of the bores 39 are advantageously less than the channel width and preferably about .043" and the length of the bores 39 are advantageously between 1/16" and 1/4", preferably about 1/16". Bore 37 is preferably of the order of about 1/4" long by 1/8" wide.

In one form of device constructed according to the present invention, the overall height of the coil, as in FIGS. 1 and 2, was 1½", the internal diameter of the nozzle at the point where the coil projects thereinto was 2", the clearance between the nozzle wall and the lowermost convolution of the coil was 7/32" and there was a clearance of ½" betwen the next successive convolution and the nozzle wall. The internal diameter of the extrusion throat as at 13 was approximately 1".

In the operation of the apparatus described above, as dough D travels down nozzle 11 under the influence of the pressure in hopper 12, it separates and flows about the injection member 29 and through the spiral helical passageway delineated thereby. As it passes the injection member downstream face 36 it provides an opening confronting the distributing channel 38. A liquid under pressure from source 25 thereof travels through the bore 28 into and along bore 37 and thence through bores 39 into distributing channel 38. The fluid along the length of the channel 38 is injected into the passing dough as a substantially longitudinally continuous spiral band extending from substantially the central axis of the dough to a point short of the outer face thereof. The injected fluid may be of any desired composition such as a fat or oil, a cinnamon flavoring composition or any desired fluid material, solution or suspension. The injected liquid is advantageously of the type which provides a filling interlayer or a plane of weakness along its plane of injection so that adjacent sections of the finished baked product as delineated by the plane of the injected fluid may be readily separated, such liquids and fillings being well known in the art. It should be noted that while channel 38 and bores 39 do not extend to the outer end of the injection member 29 so that the finished product is provided with a closed encircling ring they may extend to the outer face of the dough so as to provide a spiral filling which reaches the edge of the finished product. The filled dough D, as it leaves the area of injector member 29, is radially compressed in the constricted section 14 approaching the discharge opening 13 and is cut by the reciprocating knife 17 into dough pieces P which are deposited into the traversing pans 22 for subsequent treating, baking, and handling.

Figure 4:
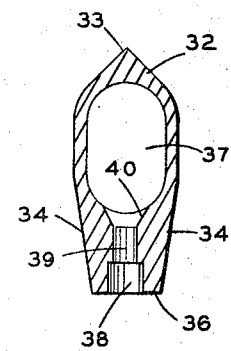
FIGURE 4 is a sectional view taken on the line 4—4 in FIGURE 2.
Figure 5:
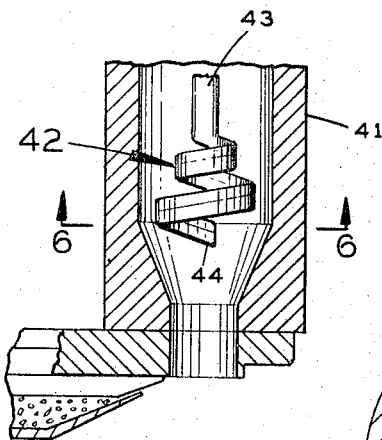
FIGURE 5 is a fragmentary vertical sectional view of another form of fluid injection element also constructed according to and embodying the present invention.
Figure 6:
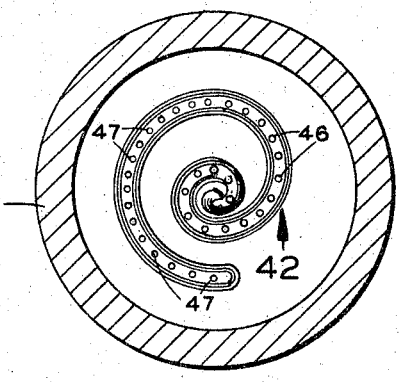
FIGURE 6 is a sectional view taken on the line 6—6 in FIGURE 5.

The embodiment of the present invention illustrated in FIGURES 5 and 6 of the drawing differs from that above described primarily in the arrangement of the injection member. Specifically, the dough forming device includes a nozzle 41 similar in configuration to that first described and provided with the associated dough feed hopper and dough cutting mechanisms. The injection member 42 is in the form of a spiral helix with descending increasing radius of curvature. The upper inner end of injection member 42 lies on the longitudinal axis of nozzle 41 and is suitably supported by a coaxially upwardly directed tube 43, said tube 43 connecting injection member 42 to a source of liquid filling material under pressure. While the closed free outer end 44 of injection member 42 preferably extends to a point short of the wall of nozzle 41 as illustrated, it may reach the nozzle wall. Injector member 42 is otherwise of the same structure as injector member 29, particularly as illustrated in FIGURE 4 of the drawings, having an upstream directed sharply tapered edge and a downwardly open channel 46 extending for the length of the injection member 42 and communicating with the interior bore thereof by way of a plurality of longitudinally spaced bores 47. The operation of the apparatus last described and the various parameters and dimensions are similar to those of the first described embodiment.

Figure 7:
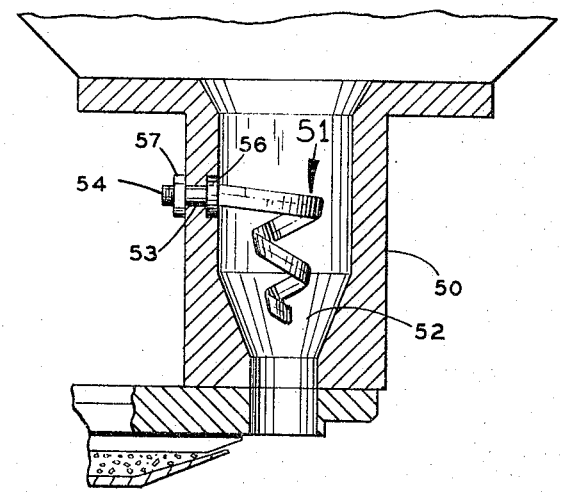
FIGURE 7 is a fragmentary vertical sectional view of a further embodiment of the fluid injection element of the present invention.

Still another embodiment of the present invention is illustrated in FIGURE 7 of the drawing and differs from those first described primarily in the orientation of the injector member. Nozzle 50 and associated components are similar to those first described. Coaxially disposed in the nozzle 50 is a liquid injection member 51 of spiral helical configuration in which the radius of curvature decreases downwardly so that successively lower convolutions are smaller. While the injection member 51 may advantageously project into the constricted section 52 of nozzle 50 it may be disposed fully above the constricted section.

The upper convolution of the injection member 51 terminates in a horizontal radially projecting tubular arm 53 extending through a mating opening in the wall of nozzle 50 and terminating in an externally threaded tubular shank 54. A flange 56 is located on arm 54 and registers with a corresponding recess in the inner face of nozzle 50. Injection member 51 is locked in position by a nut 57 engaging threaded shank 54, and is connected to a source of filler liquid under pressure in any suitable manner. As in the earlier embodiments, the downwardly directed face of the injection member 51 has a longitudinal channel formed along the length thereof which communicates with the interior bore of the injection member by way of interconnecting openings along the length of the channel and interior bore. The dimensions and parameters of injection member 51 are advantageously those earlier set forth and the last described apparatus operates in the manner of that first described.

While there have been described and illustrated preferred embodiments of the present invention it is apparent that numerous alterations, omissions and additions may be made without departing from the spirit thereof. What is claimed and desired to be secured by Letters Patent is:

1. A device for producing shaped pieces of dough comprising a nozzle having a discharge opening, means for extruding dough along said nozzle through said discharge opening, and a tubular injection member substantially in the shape of a helix of decreasing diameter located in said nozzle and having means along the length thereof providing access thereto for introducing fluid into the dough.

2. A device for producing shaped pieces of dough comprising a nozzle having a discharge opening, means for extruding dough along said nozzle through said discharge opening, and a tubular member substantially in the shape of a helix of decreasing diameter located in and extending axially along said nozzle and having access means along the length thereof for injecting fluid into the dough, and means for connecting said fluid injecting member to a source of fluid under pressure.

3. The device of claim 2, wherein said tubular member has openings formed therein along the length thereof.

4. The device of claim 3, wherein said fluid injecting openings are directed toward the nozzle discharge opening.

5. The device of claim 2, wherein the lower edge of said tubular injection member is above the adjacent upper edge of the next lower convolution thereof.

6. The device of claim 2, wherein the radius of curvature of said injecting member decreases approaching the nozzle discharge opening.

7. The device of claim 2, wherein the radius of curvature of said injecting member increases approaching the nozzle discharge opening.

8. A device for producing shaped pieces of dough comprising a nozzle having a discharge opening, means for extruding dough downstream along said nozzle and through said discharge opening, a tubular injection member substantially in the shape of a helix of decreasing diameter located in and extending axially along said nozzle and having formed therein along the length thereof a plurality of longitudinally spaced downstream directed openings, and means for connecting said injection member to a source of fluid under pressure.

9. The device of claim 8, wherein said injection member has a sharp upstream directed face.

10. The device of claim 8, wherein said injection member has formed along the bottom face thereof a longitudinally extending channel communicating with the interior thereof by way of said openings formed therein.

11. A device for producing shaped pieces of dough comprising a nozzle having a discharge opening, means for extruding dough downstream along said nozzle and through said discharge opening, a tubular injection member substantially in the shape of a helix of decreasing diameter located in and extending axially along said nozzle, an elongated channel in and extending substantially along the length of the downstream face of said fluid injecting member, a plurality of longitudinally spaced bores extending between said channel and the interior of said injection member, and means for connecting said injection member to a source of fluid under pressure.

12. The device of claim 10 wherein the width of said channel is between $\frac{1}{64}''$ and $\frac{1}{8}''$.

13. The device of claim 10, wherein the depth of said bores is between $\frac{1}{16}''$ and $\frac{1}{4}''$.

14. The device of claim 10, wherein said bores have funnel shaped inner ends.

15. The device of claim 10, wherein said injection member is mounted on a wall of said nozzle.

16. The device of claim 10, wherein said nozzle converges toward said discharge opening.

17. A device for producing shaped pieces of dough comprising a nozzle having a discharge opening, means for extruding dough downstream along said nozzle and through said discharge opening, a tubular injection member located in and extending across said nozzle and having formed in and along the length thereof a plurality of longitudinally spaced bores extending between the interior of said injection member and the downstream face thereof, an elongated channel in said downstream face across the downstream ends of the bores, and means for connecting said injection member to a source of fluid under pressure.

18. In a device for producing shaped pieces of dough comprising an elongated, vertically disposed nozzle having a discharge opening and means for extruding dough downstream along said nozzle toward and through the discharge opening of said nozzle, the improvement comprising a tubular fluid injection member substantially in the shape of a helix of decreasing diameter disposed within the nozzle and extending axially therealong, the convolutions of which member are vertically and horizontally spaced apart, and the injection member is provided with a channel along its downstream face along which to introduce the fluid into the dough.

References Cited by the Examiner

UNITED STATES PATENTS

| | | |
|---|---|---|
| 2,246,871 | 6/1941 | Balch. |
| 2,667,846 | 2/1954 | Grumbly. |
| 2,982,231 | 5/1961 | Fries. |

ROBERT E. PULFREY, *Primary Examiner.*

J. D. BEIN, *Examiner.*